United States Patent [19]
Umeda et al.

[11] Patent Number: 5,453,570
[45] Date of Patent: Sep. 26, 1995

[54] KARAOKE AUTHORING APPARATUS

[75] Inventors: Toshihiko Umeda; Tomoyuki Tanaka, both of Kanagawa; Masaaki Hamada, Aichi; Yasuhiro Maruyama, Tokyo, all of Japan

[73] Assignees: Ricoh Co., Ltd.; Ricos Co., Ltd., both of Japan

[21] Appl. No.: 173,682

[22] Filed: Dec. 23, 1993

[30] Foreign Application Priority Data

Dec. 25, 1992 [JP] Japan .................................. 4-358307
Dec. 7, 1993 [JP] Japan .................................. 5-340585

[51] Int. Cl.$^6$ .............................. G09B 15/02; G10H 1/40
[52] U.S. Cl. ............................ 84/636; 84/645; 84/477 R; 84/DIG. 12
[58] Field of Search .................... 84/601, 602, 609–614, 84/634–638, 645, 477 R, 478, DIG. 6

[56] References Cited

U.S. PATENT DOCUMENTS 5,046,004 9/1991 Tsumura et al. .
5,127,303 7/1992 Tsumura et al. .......................... 84/609
5,194,683 3/1993 Tsumura et al. .......................... 84/645

*Primary Examiner*—Stanley J. Witkowski
*Attorney, Agent, or Firm*—Thompson, Hine and Flory

[57] ABSTRACT

Disclosed is a karaoke authoring apparatus for mixing or authoring karaoke music data based on an electronic music sound source. The invention can analyze chronologically, in a sound reproduction block, the musical performance data expressed by a code such as MIDI code and has a pre-inserted event code, and will generate an interrupt in a timer circuit at a time interval based on the tempo instruction on the code. The invention can also acquire, as an individual file at the timing of the event code, an integrated value given by the timer circuit in accordance with the type of event, and combine and arrange these files in chronological order to calculate a time difference between consecutive event codes, for producing time data. The authored data allows color turning of the words of the music, page turning, presentation of the title of the music and a video image update which is performed accurately to the timing as planned, in synchronism with the musical performance.

5 Claims, 6 Drawing Sheets

| | | | | b | n |
|---|---|---|---|---|---|
| WORDS DATA ON PAGE n | WORDS DATA PER PAGE | | | | |
| | DATA SIZE (BYTES) | LINE OF WORDS | LINE 5 | * | 1 |
| | | | ~ | ~ | ~ |
| | | | LINE 1 | * | 1 |
| | | AGATE LINE | LINE 5 | * | 1 |
| | | | ~ | ~ | ~ |
| | | | LINE 1 | * | 1 |
| | WORD GROUP COLOR (TURNED) | CHARACTER OUTLINE COLOR | LINE 5 | * | 1 |
| | | | ~ | ~ | ~ |
| | | | LINE 1 | * | 1 |
| | | CHARACTER COLOR | LINE 5 | * | 1 |
| | | | ~ | ~ | ~ |
| | | | LINE 1 | * | 1 |
| | WORD GROUP COLOR | CHARACTER OUTLINE COLOR | LINE 5 | * | 1 |
| | | | ~ | ~ | ~ |
| | | | LINE 1 | * | 1 |
| | | CHARACTER COLOR | LINE 5 | * | 1 |
| | | | ~ | ~ | ~ |
| | | | LINE 1 | * | 1 |
| NO. OF WORDS | | | | n | 2 |
| NO. OF AGATE LINE | | | | n | 1 |
| PRESENCE OR ABSENCE OF CONTINUED PAGE | | | | * | 1 |
| NO. OF LINES PER PAGE | | | | F | 1 |
| WORDS / SPEECH FLAG | | | | 0 | 1 |
| DATA SIZE ON THIS PAGE | | | | n | 2 |

FIG. 2

KARAOKE AUTHORING APPARATUS

BACKGROUND OF THE INVENTION

1) Field of the Invention

The present invention relates to the mixing of karaoke music using electronic musical sound sources like synthesizers according to the MIDI Standards. The present invention particularly relates to an authoring apparatus which synchronizes the reproduction of karaoke music of a song, the presentation of the song's words(lyrics) on a screen, the presentation of associated images, and the presentation of the title of the karaoke music and the like.

2) Description of the Prior Art

It is known that a karaoke music is generated by electronic musical sound sources according to the MIDI (Musical Instrument Digital Interface) Standards. (Karaoke is the practice of singing to recorded backing music as a form of relaxation, and karaoke music is that recorded backing music. In most cases, a monitor screen is also provided which presents the words of a song so that a singer may sing the song in synchronism with the backing music while watching words on the monitor screen, and the words are usually presented line by line with associated video images also presented in the background on the monitor screen). Such an example is disclosed in Japanese Patent Application Laid-Open No. Hei-3-240385. Karaoke generally requires not only the synchronization between the reproduction of a backing music and the display of video images, but also the synchronization between the reproduction of the backing music/images and the display of words. Thus, a karaoke machine using electronic musical sound sources also requires the synchronization between these factors. Conventional techniques to synchronize the display of words and images are disclosed by Japanese Patent Application Laid-Open No. Hei-3-241566 and Japanese Patent Application Laid-Open No. Hei-3-241581.

The synchronization between the reproduction of music and the presentation of background video images and associated words is also assured in widely used karaoke machines with optical disk. The synchronization operation is performed in an authoring action in which studio crew combine words with a music and video images being reproduced using a slide volume control in a studio at the final stage of the production of a karaoke music and associated picture.

In such a conventional karaoke machine using electronic musical sound sources, the synchronization of words is left to the responsibility of a reproducing machine. No clear disclosure has been provided to detail what authoring technique is used to insert a synchronization signal into control data when the control data according to the MIDI Standard is generated.

In the karaoke machine not using electronic musical sound sources, studio crew control the flow of words' listening to a reproduced music while watching background video images to combine them all. In this case, studio crew require a high standard of skill to do authoring, and thus untrained crew cannot do the same job. This means that specially trained personnel are used, and the efficiency in authoring is particularly poor.

SUMMARY OF THE INVENTION

It is an object of the present invention to provide an authoring apparatus which generates timing data for synchronizing a music of a song, video images, and the song's title by simply processing data which is intended for use with a karaoke machine using electronic musical sound sources according to the MIDI Standard. The authoring apparatus in the context of the present invention means a device which controls chronologically the presentation of the words of a song and associated video images on a screen, and illumination level of the video images with respect to the flow of music that is performed by processing a musical code such the MIDI code.

It is another object of the present invention to provide a method which allows an easy authoring according to the type of event to which synchronization operation is performed.

To achieve the above objects, the authoring apparatus according to the present invention comprises means for analyzing chronologically in a sound reproduction block the musical performance data comprising musical data expressed by a code such as the MIDI code and having an pre-inserted event code, and for generating an interrupt in a timer processing circuit at the time interval on the basis of the tempo instruction from said code, means for acquiring as an individual file at the timing of the event code an integrated value given by said timer circuit in accordance with the type of an event, and means for combining these files, arranging them in chronological order, calculating time difference between consecutive events, and for producing timing data.

The event codes include a code indicating the turn of each page of words displayed on the monitor screen of a karaoke machine, and a code indicating the turn of the color of each word group of the words on a page. These event codes are pre-inserted into the musical data to synchronize the turn of the word page and the turn of the word group color to the musical performance. The event codes that are pre-inserted into the musical data further includes a code indicating the timing of the turn of the background video image presented on the karaoke monitor screen. Thus, a series of the background video images is synchronized with the musical performance. The event codes that are preinserted into the musical data further includes a code indicating the timing of the presenting of the title of a song on screen and the timing of the removal of the title from the screen. This code allows the on-screen presentation of the song's title to be synchronized with the musical performance. The event codes include all above codes, and all the codes are synchronized to the musical performance.

When purpose-specific event codes are inserted as necessary into the musical data expressed in a musical sound source control code such as the MIDI code, each event is presented precisely to the timing of the reproduction of the musical data. The musical performance data thus produced functions as basic data for the authoring operation. When this chronological data is reproduced, the tempo instruction is extracted. In response to the variation of tempo, a clock setting value changes. This is an important factor which allows the music to be reproduced accurately along the flow of time. Acquiring a file by the type of the event code helps manage a timer table by event, and allows the files to be stored by event. The timing data which is produced by combining files has the function of allowing all the events to be timed with the performance of the music.

BREIS DESCRIPTION OF THE DRAWINGS

FIG. 2 is a diagram showing the structure of words data of a song.

DESCRIPTION OF THE PREFERRED EMBODIMENT

Figure 1:
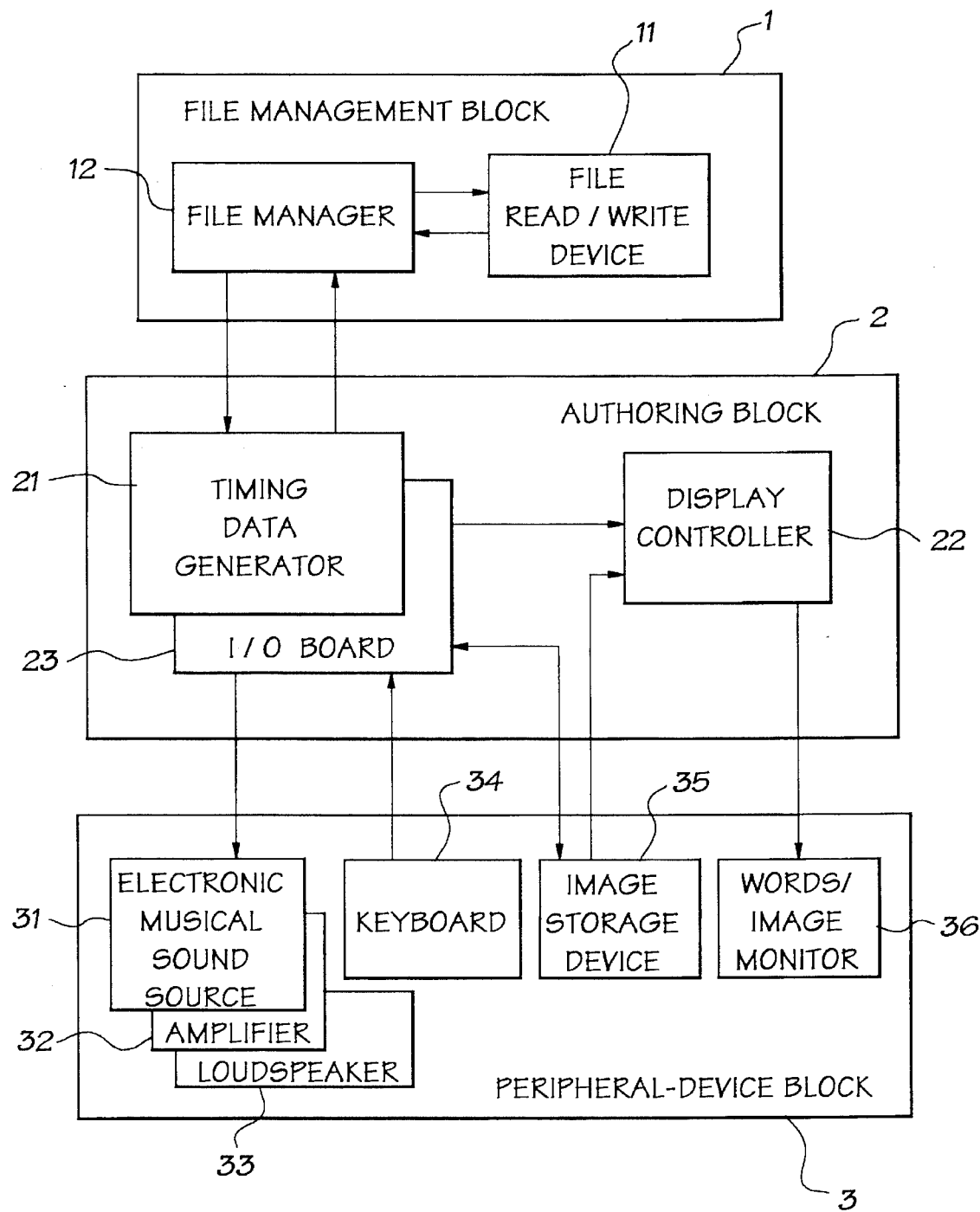
FIG. 1 is a block diagram showing generally the authoring apparatus according to the present invention.

Referring now to the drawings, the embodiment of the present invention is now discussed. The arrangement for the synchronization between the music of a song and its words is discussed. FIG. 1 is a block diagram showing the authoring apparatus for synchronizing words to the music performance. The device is constructed of three large block. A file management block, designated 1, stores pre-author data and authored data, wherein the pre-author data comprises musical performance data made of MIDI coded musical data into which note data and turn page data for words are inserted, and words data including character codes and color code. An authoring block 2, constituting the core into which the present invention is embodied, processes the words data on the basis of the musical data given by the file management block 1. A peripheral-device block, designated 3, helps an authoring operator to monitor the progress of the timing operation of words and the words' balance with the background video image. The file management block 1 comprises a file read/write device 11 and a file manager 12.. The file read/write device 11 reads the musical performance data and the words data, and then writes these data, after they are authored, onto a desired storage medium. The file manager 12, organized around a CPU, connects the file read/write device 11 to the authoring block 2 to send the pre-author data to the authoring block 2, and allows the file read/write device 11 to write the authored data to be written onto the storage medium. The authoring block 2 comprises a timing data generator 21 for performing required processing on the words data referring to the musical performance data sent from the file manager 12, a display controller 22 for monitoring the content of the processing being carried out by the timing data generator 21, and an I/O board 23 for connecting the authoring block 2 to devices in the peripheral-device block 3. The peripheral-device block 3 comprises an electronic musical sound source 31 for reproducing the MIDI coded musical data as a music, an amplifier 32, a loudspeaker 33, a keyboard 34 for allowing an operator to perform a required keystroke operation to the authoring block 2, an image storage device 35 for storing a plurality of video images onto an optical disk, allowing a requested image to be output to the authoring block 2, and for combining the requested image with character signal which the display controller 22 generates from the words data, words/image monitor 36 for presenting karaoke image which the display controller 22 generates by combining the video image and the character signal.

Figure 3:
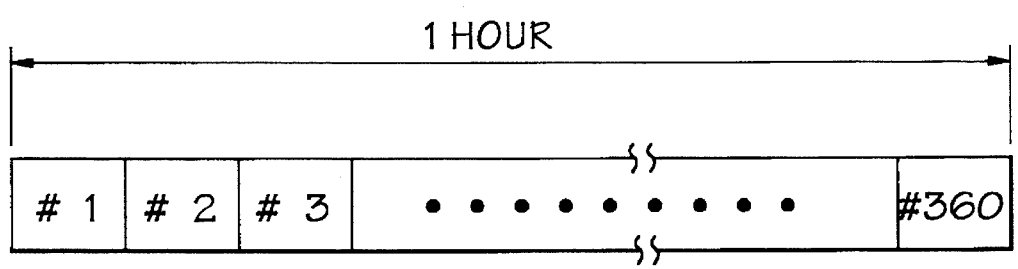
FIG. 3 is a diagram showing the structure of video image data.

The above arrangement perform data processing in order to indicate to a singer on a karaoke monitor screen, the portion of the words to currently sing in synchronism with the backing music being reproduced. For example, the textual presentation of the words on screen may be sequentially changed in synchronism with the flow of the music, or an arrow mark may be presented which moves along the textual presentation of the words in synchronism with the flow of music. The authoring operation also provides the timing at which adequate background video images are presented in synchronism with the flow of the music performance. Before discussing the operation of the authoring, the musical data, words data and video image data are detailed below. The musical data is produced on the basis of the MIDI code which meets the MIDI Standard. Technically, however, it is not necessarily required that the musical data be MIDI coded; for the purposes of the present invention it is sufficient enough if the standard used for producing the musical data agrees with the standard used for the electronic musical sound source contained in a karaoke machine which actually performs a music. The words data, which is one complete song data long, is made up of a plurality of pages as shown in FIG. 2. Each page holds the number of word groups, word group color turn processing time ($\Delta N$), and the number of dots per word group. The page in the context of the present invention means a unit of words which a single screen presents at a time. Each page turning renews a page, advancing the display of the words. The word group in the context of the present invention means a group of words of which color is changed together. A plurality of video images is stored in the optical disk. As shown in FIG. 3, for example, video image data one hour long is segmented in units of 10 seconds, and the segmented images are serially numbered (#1, #2, . . . #360). The serial numbers are then used to manage the image data. A total of 360 segmented images may be any type of video image in the context of the present invention. The segmented video images may be a series of pictures presenting a story, or a collection of unrelated scenes, or dynamic images or still pictures.

Figure 4:
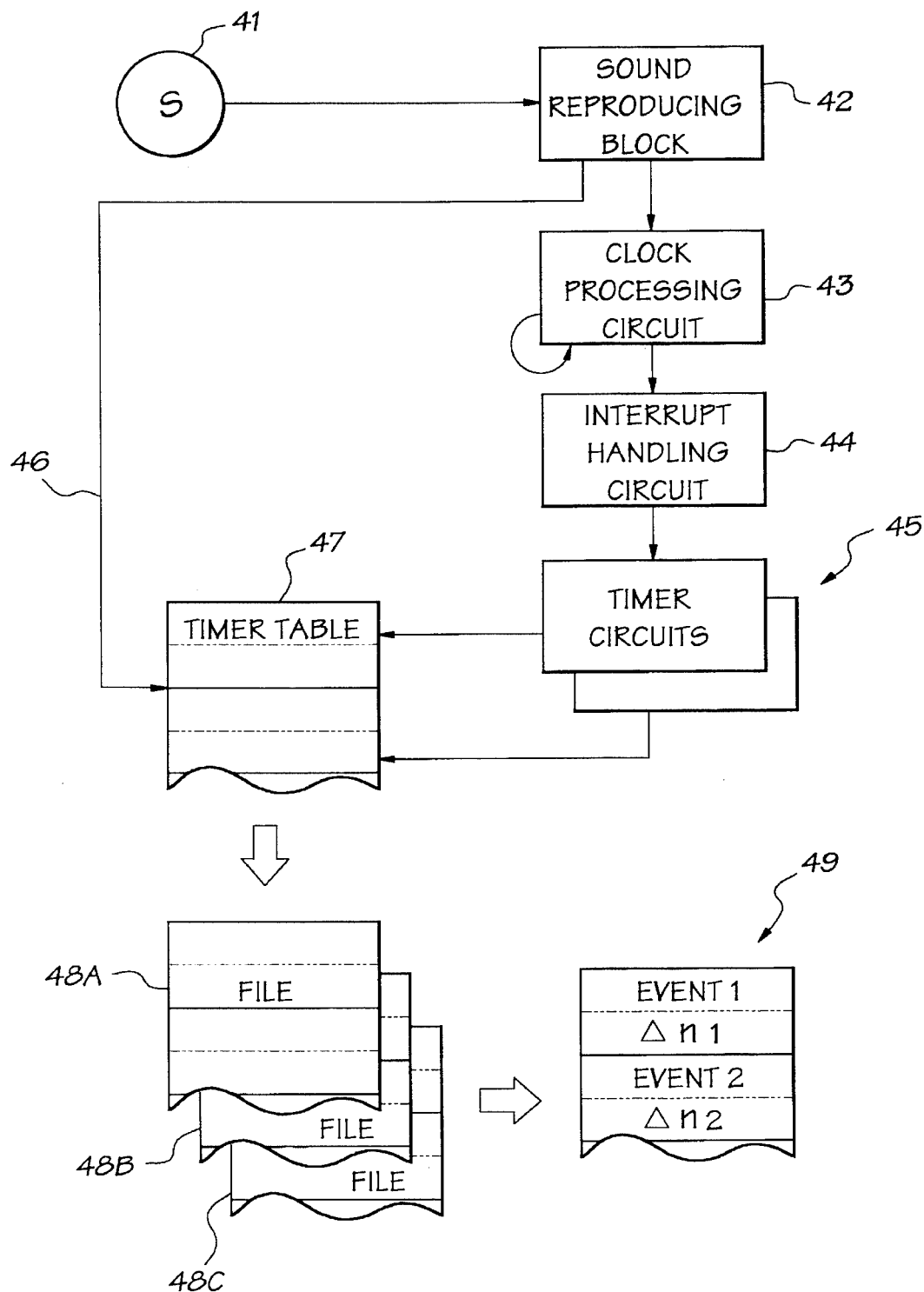
FIG. 4 is a block diagram showing the timing data generator of the authoring apparatus.

The timing of word group color turning should be put in synchronism with the reproduction of music. That timing is determined as follows. The timing information, extracted from the music performance data, is produced as the timing data by the authoring apparatus. Referring to FIG. 4, the operation of the authoring apparatus for the production of the timing data is detailed. Shown in FIG. 4 are a start signal 4 for initiating the authoring procedure, and a sound reproducing block 42 for analyzing the musical performance data comprising the MIDI code musical data into which event codes are inserted. The analysis starts with the head of the musical performance data. The musical performance data has type-identifying event codes already processed for insertion in synchronism with the timing data for word group color turning and page turning in the display in synchronism with the flow of music.

The above processing is defined as pre-processing. The pre-processing is briefly discussed below. A computer is used to insert the event codes into the MIDI coded musical data to make a file A. The event code is a generic term referring to the start of the title of a song, the turning of a page, the turning of a word group color and the termination of the coloring of the word group, the start of scrolling of a speech which is a variation of the words, the updating of a video image, and the start of chorus. The words of a song are arranged in a suitable layout, divided into word groups to be used for word group coloring, and then the number of dots to the heading word of each word group are determined along the direction of the display of each word group (X direction if the word groups are horizontally displayed or Y direction if the word groups are vertically displayed). The color of characters and the color of character outlines are also set up and then the setting is stored as a file B. The order of presentation of video images is then determined and then stored as a file C. The data file of the titles of songs on bitmaps is made as a file D. These files A through D are stored, in advance, onto the storage medium in the file read/write device 11 shown in FIG. 1. The authoring operation is initiated by reading files A through D as appropriate in accordance with the type being authored.

A clock processing circuit 43 counts a clock pulse according to the tempo information indicated by a tempo instruction (MIDI coded) if the tempo instruction is found in the file A that has been analyzed by the sound reproducing block 42. The clock processing circuit 43 issues an interrupt trigger signal when a value set by the tempo information is reached. The change of tempo thus causes the change of counting. Upon receiving the interrupt trigger signal from the clock processing circuit 43, an interrupt handling circuit 44 interrupts the circuits that follow it, according to an interrupt vector table. The interrupt handling circuit 44 outputs the interrupt timing output along with the interrupt type identification signal. In this embodiment, the interrupt type identification signal includes two types: one for calculating the total running time ($\Delta n$) from the start of a music performance and the other for calculating the time ($\Delta N$) from the previous color turning. The two types of outputs from the interrupt handling circuit 44 are sent to respective timer circuits 45 to drive them separately. Since $\Delta n$ is the running time from the start of the performance, the timer circuit 45 is initiated by the interrupt signal $\Delta n$ at the moment the performance starts and continue to count until the performance ends. $\Delta N$ is the running time from the moment the word group, which inserted into the musical performance data, is first displayed, and the corresponding timer circuit 45 is initiated at the moment the words are displayed. While the sound reproducing block 42 provides its outputs to the clock processing circuit 43, the sound reproducing block 42 also gives the timing output 46 for event codes to the timer circuit 45. At this timing, the two timer circuits 45 calculates two types of running times for each event type, and makes a timer table 47. The timer table 47 thus holds two types of information: the running time $\Delta n$ from the start of the music and the running time $\Delta N$ from the color turning. The above process is repeated until the examination of the musical performance data is completed. When a MIDI code indicative of the end of the musical performance data is detected, the timer table 47 is divided by event type into files 48a and 48b. The files 48a and 48b are combined and then arranged in chronological order in which the event codes take place. In this chronological arrangement, regardless of $\Delta n$ or $\Delta N$, a series of time intervals between every two consecutive events $\Delta n1, \Delta n2, \Delta n3, \ldots, \Delta nn$ are determined, resulting in timing data 49. In this embodiment, the files A and B are used to explain the timing data for the presentation of the words, and two types of events are used. In the timing of the updating of background video image as explained later, a file C will be used for the authoring operation. In this case, the timing data of the picture updating is inserted into the timing data 49 in the chronological order.

Figure 5:
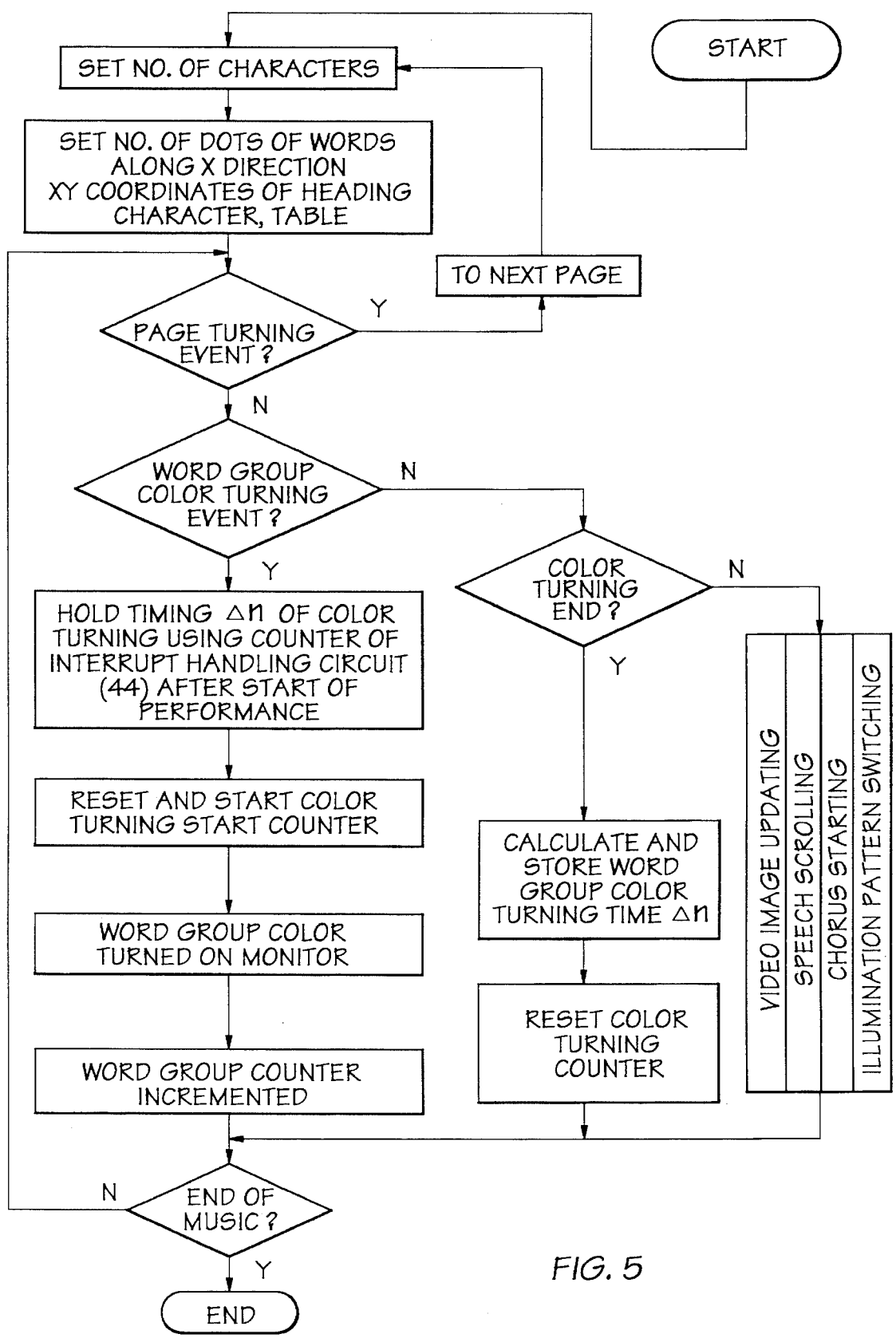
FIG. 5 is a flow chart authoring the timing of the color turning.

FIG. 5 is a flow chart showing the procedure for turning the color of the words. Based on the file B produced in the pre-processing, the number of character strings of each page is set, and the number of dots required to display the character strings along the direction of display and the XY coordinates of the heading character are set. In succession to the file B, the processing of the same page may be continued before a next page turning event comes in: when a color turning event is detected, the counter of the interrupt handling circuit 44 starts counting the running time from the start of the music performance; and the color sample is then displayed on the monitor screen. This processing is repeated until a color turning ending event code is detected. When the color turning ending event code is detected, the resulting word group coloring time and $\Delta N$ are calculated and stored in a table. The counter of the interrupt handling circuit 44 is then reset to allow a next calculation to start over. When a detected event code is neither a page turning event code nor a color turning event code, the event code to be performed may be video image updating, speech scrolling, chorus starting or illumination controlling.

Discussed next is the authoring operation for synchronizing video image presentation with the performance of a music. Although this authoring also uses the authoring apparatus in FIG. 4, the music performance data is made of the MIDI coded musical data into which, in addition to the color turning event code, video image event codes identifying video data numbers (#1, #2, . . . ,#360) specified by a video storage device 35 are inserted in advance. The file C is used to determine the chronological order of video image. The discussion here is based on the assumption that the above-described authoring operation for the words of a song is already completed on the authoring apparatus. In practicing a karaoke, an initial display is presented on a monitor screen prior to the start of the performance. The initial display cannot be synchronized with the start of the examination of the musical performance data. Thus, it is assumed that the authoring operation for synchronization starts with the examination of the musical performance data just started rather than prior to the initial display. When the sound reproducing block 42 in the authoring apparatus shown in FIG. 2 starts analyzing the musical performance data, the clock processing circuit 43 starts counting according to the tempo instruction until a set value is reached, and an interrupt trigger signal is then output when the set value is reached. The interrupt trigger signal allows the timer circuit 45 to initiate the counting of running time, and at the same time the sound reproducing block 42 outputs a video event code 46. At this timing, the running time from the start of the music performance until each video event code is written onto the timer table. A file 48c for video image timing is produced independently of the files 48a and 48b described above. The file 48c along with files 48a and 48b is subjected to time interval calculation for every consecutive events, resulting in a combined timing data.

Figure 6:
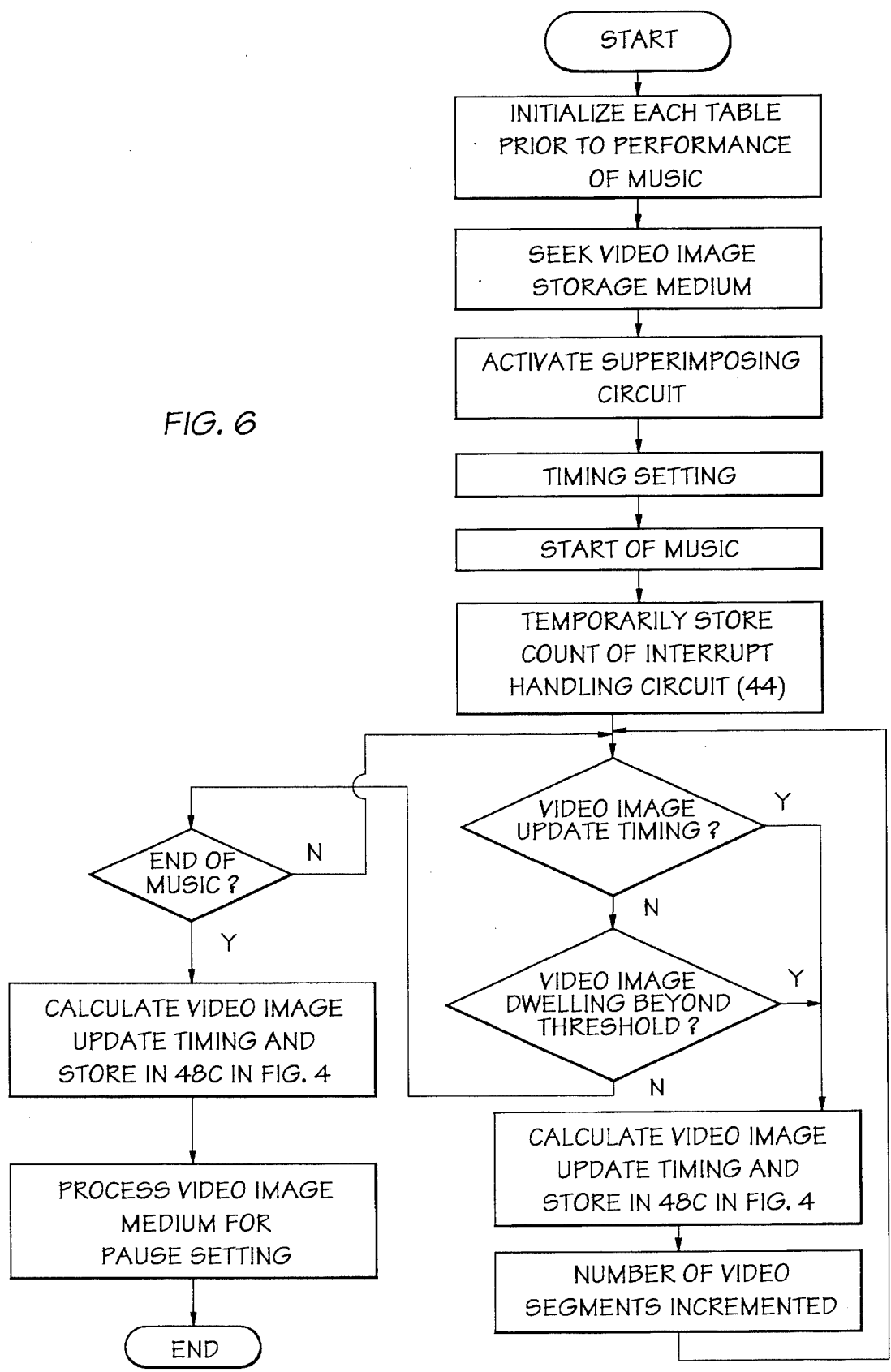
FIG. 6 is a flow chart authoring the timing of the video image updating.

FIG. 6 is a flow chart which may help understand more easily the video image timing processing. When the processing starts, initialization takes place prior to the performance of a music, seeking a video storage medium, reading a data file if the video storage medium is provided with an initial display screen, and superimposing the content of the file on screen. When the performance of the music starts, the count of the counter of the interrupt handling circuit 44 is temporarily stored, the apparatus is ready for detection of a video image updating event code. When the video image updating event code is detected, a video update time is calculated and stored in the file 48c in FIG. 4. Then, a next predetermined video is sought, and the number of video segments is incremented. Such processing is repeated until the performance of the music ends. In this embodiment, to prevent the same video from being displayed on screen continuously too long, the apparatus forces the video to update if no video update event code comes in within 18 seconds. A force update time is not limited to 18 seconds, and a longer or shorter update time limit may be perfectly acceptable. The video presentation is continually updated until the performance of the music ends, and the file 48c for a song is thus completed. Because of its data capacity, an optical disk is typically used as a video storage medium. It maybe perfectly acceptable that the apparatus comprises a pair of optical disk devices to be used alternately to avoid time delay because of seek time.

As detailed above, in the embodiment of the authoring apparatus according to the present invention, single timing data allows page turning of the words, color turning, and video updating to be performed in synchronism with the performance of a music. The events are inserted into the MIDI data in advance; however, by allocating each event code to an appropriate key as a shortcut key on the keyboard 34 in FIG. 1, a single keystroke allows that allocated event to take place. As already described, the video image storage device 35 for reproduction of video image signal may comprise a pair of optical disk devices configured in parallel. To update the video on screen, two optical disk devices may be accessed alternately to avoid a time delay involved in switching of the video in a single optical disk system. The words displayed on the karaoke machine may be superimposed onto the video on screen using the prior art.

Discussed next is the authoring operation for measuring the timing at which the title screen of a song is superimposed onto a video image. A conventional title screen uses a character font; and character codes, the size of the characters and the location of the characters are specified in order to minimize the amount of data involved. This risks a stereotypical and even boring title screen, and lessens the visual effect on the video screen. The present invention presents the title of a song as bitmap images to enhance diversity of the title presentation. The musical performance data is thus produced by inserting the presentation timing of the title as an event code in advance into the musical data. The authoring apparatus shown in FIG. 4 authors the timing of the title presentation along with other types of timings for words presentation and video image presentation. All these pieces of timing information are combined to make the timing data. Thus, the start and end timings of the title screen is flexibly set up.

According to the present invention, the authoring apparatus produces timing data as described above. In FIG. 1, first, the file manager 12 reads the musical performance data, words data, title data from the file read/write device 11. The authoring block 2 initiate the authoring operation by extracting these data while reading the video image of which number is specified by the video storage device 35. An operator watches the monitor 36 to verify the timings while listening the music reproduced by the electronic musical sound source 31. In the course of this processing, the authoring block 2 undergoes the processing already discussed referring to FIG. 4. To end the authoring operation, the file manager 12 reads the timing data and allows it to be stored onto the file read/write device 11.

According to the embodiment of the present invention, the authoring operation is performed such that essential factors for practicing karaoke, including the presentation of words and the presentation of video image and title screens, are synchronized with MIDI coded music by resulting in timing data. Since the timing data allows all the event timings to be processed sequentially in chronological order, an actual karaoke machine reproduces music sound, the words of a song, and video images as originally set and intended in the authoring operation. Once the inserting of event codes into musical data is completed, the remainder of the authoring operation for synchronization is left to unskilled crew. Thus, the efficiency in the production of the timing data dramatically improves.

Event codes may be inserted into arbitrary locations of the MIDI coded data, and a great deal of freedom is allowed in a variety of synchronization. This results in a creative karaoke authoring.

What is claimed is:

1. A karaoke authoring apparatus comprising:

means for analyzing chronologically in a sound reproduction block, musical performance data expressed by MIDI code, said analyzing means having a pre-inserted event code, and being capable of generating an interrupt in a timer circuit at a time interval based upon a tempo instruction of said code;

means for acquiring as individual files at the timing of said event code, an integrated value given by said timer circuit in accordance with the type of event; and means for combining said individual files and arranging said files in chronological order to calculate a time difference between consecutive event codes, said combining means producing timing data.

2. The karaoke authoring apparatus of claim 1 further comprising a page code indicating a turn of each page of words displayed on a monitor screen of a karaoke machine and a color code indicating a turn of color of each word group of music on each of said pages, said event codes being inserted into said musical performance data in advance, wherein files corresponding to said page code and said color code are acquired and combined to result in timing data.

3. The karaoke authoring apparatus of claim 1 further comprising an update code indicating update timing of a video image displayed on a screen of a karaoke machine, said update code being pre-inserted into said musical data, wherein a file corresponding to said update code is acquired to result in timing data.

4. The karaoke authoring apparatus of claim 1 further comprising a timing code indicating presentation and removal timings of a title screen of music, said timing code being pre-inserted into said musical data, wherein a file corresponding to said timing code is acquired to result in timing data.

5. The karaoke authoring apparatus of claim 1 further comprising a page code indicating a turn of each page of words displayed on a screen of a karaoke machine, a color code indicating a turn of color of each word group on a page, an update code indicating update timing of a video image, and a timing code indicating presentation and removal timings of a title screen of music, all of said codes being pre-inserted into said musical data, said apparatus further comprising files acquired according to said codes, said files being combined and arranged in chronological order to calculate a time difference between consecutive event codes and to produce timing data.

* * * * *